(12) United States Patent
Bello et al.

(10) Patent No.: US 7,401,124 B2
(45) Date of Patent: Jul. 15, 2008

(54) APPARATUS AND METHOD TO WRITE INFORMATION TO TWO GEOGRAPHICALLY SEPARATED VIRTUAL TAPE SERVERS

(75) Inventors: Keith A. Bello, Oro Valley, AZ (US); Dean L. Hanson, Tucson, AZ (US); Gregory T. Kishi, Oro Valley, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 10/656,679

(22) Filed: Sep. 5, 2003

(65) Prior Publication Data

US 2005/0055396 A1    Mar. 10, 2005

(51) Int. Cl.
 *G06F 15/167* (2006.01)
(52) U.S. Cl. ............... 709/213; 709/216; 711/4; 711/5; 711/111; 711/154; 711/171
(58) Field of Classification Search ......... 709/212–216; 711/4, 5, 111, 154, 171
See application file for complete search history.

(56) References Cited

U.S. PATENT DOCUMENTS

| | | | | |
|---|---|---|---|---|
| 5,627,970 | A | 5/1997 | Keshav | 395/200 |
| 5,799,002 | A | 8/1998 | Krishnan | 370/234 |
| 5,909,561 | A | 6/1999 | Arimilli et al. | 395/309 |
| 5,926,834 | A | 7/1999 | Carlson et al. | 711/152 |
| 6,292,834 | B1 * | 9/2001 | Ravi et al. | 709/216 |
| 6,349,354 | B1 | 2/2002 | Garney | 710/127 |
| 7,206,280 | B1 * | 4/2007 | Khan et al. | 714/748 |
| 2002/0147774 | A1 * | 10/2002 | Lisiecki et al. | 709/214 |
| 2003/0018794 | A1 | 1/2003 | Zhang et al. | 709/231 |

FOREIGN PATENT DOCUMENTS

WO      WO9828679      7/1998

OTHER PUBLICATIONS

International Business Machines Corporation, "z/OS VlR3 DFSMS Introduction", 1980, 2002, pp. 1-140.
Kramer, et al., "Effective Use of Cray Supercomputers," 1989, pp. 721-731.

* cited by examiner

*Primary Examiner*—Phuoc H Nguyen
(74) *Attorney, Agent, or Firm*—Dale F. Regelman; Quarles & Brady LLP

(57) ABSTRACT

A method to write information to two geographically separated virtual tape servers, where the method provides a file to a virtual tape controller, writes that file to a first virtual tape server, and queues a copy job for the file in the virtual tape controller. Subsequently, the method provides the file to a second virtual tape server. The method sets a throughput threshold, determines the actual VTC throughput, and determines if the actual VTC throughput exceeds the throughput threshold. The method sets an age threshold and determines if the copy job age is greater than that age threshold. If the actual VTC throughput is greater than the throughput threshold and the copy job age is greater than the age threshold, then the method decreases the first adjustable host bandwidth and/or the second adjustable host bandwidth, otherwise the method restores the bandwidth to a nominal value.

11 Claims, 7 Drawing Sheets

200

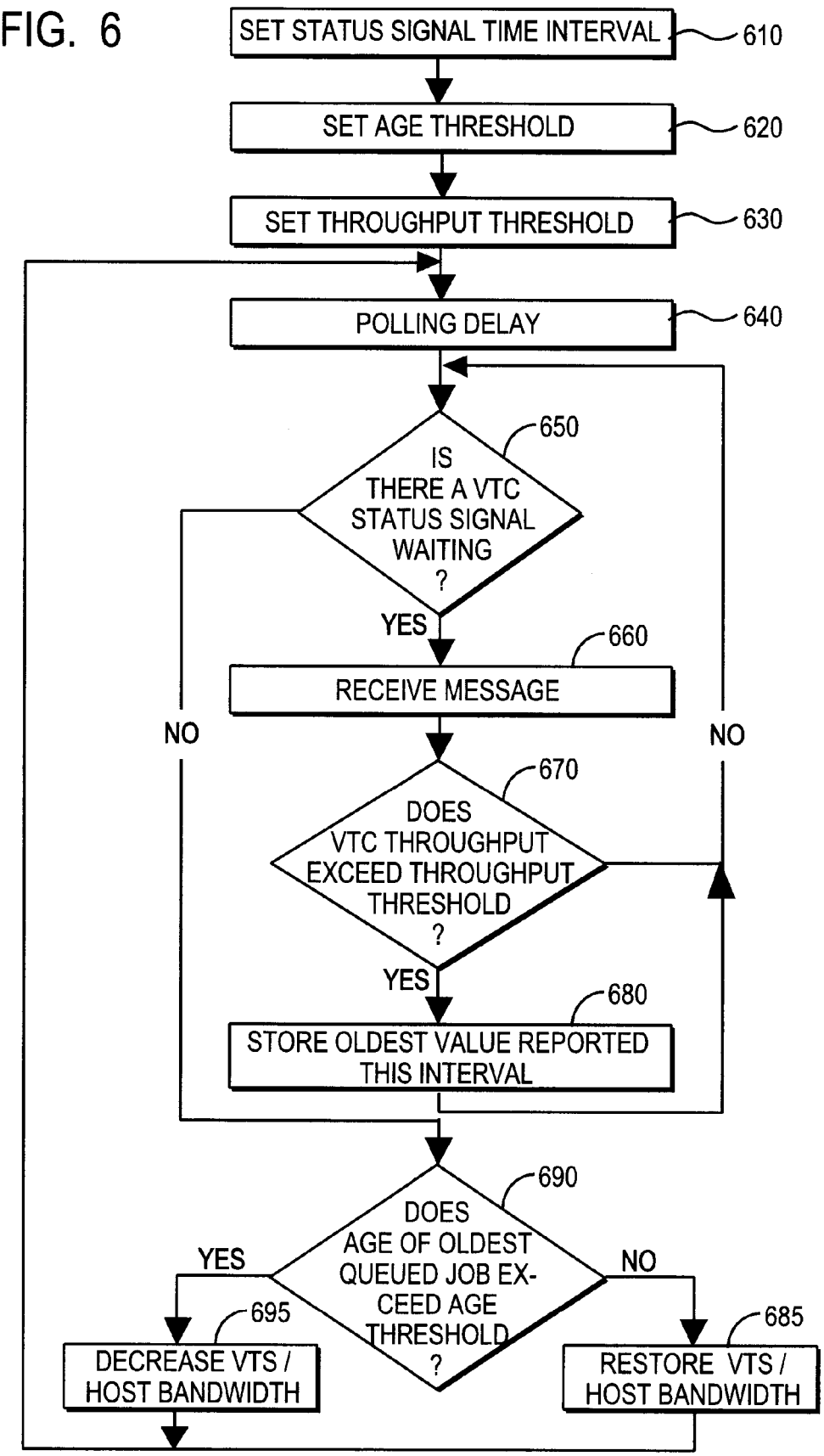

APPARATUS AND METHOD TO WRITE INFORMATION TO TWO GEOGRAPHICALLY SEPARATED VIRTUAL TAPE SERVERS

FIELD OF THE INVENTION

Applicant's invention relates to an apparatus and method to write information to two geographically separated virtual tape servers.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

More recently introduced data disaster recovery solutions include "remote dual copy," where data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers.

The secondary site must not only be sufficiently remote from the primary site, but must also be able to backup primary data in real time. The secondary site needs to backup primary data in real time as the primary data is updated, with some minimal delay.

What is needed is an apparatus and method to autonomically optimize the rate of transmission of information between geographically separated virtual tape servers.

SUMMARY OF THE INVENTION

Applicants' invention includes a method and apparatus to write information to two geographically separated information virtual tape servers, where a first virtual server includes one or more first virtual host devices comprising a first adjustable aggregate bandwidth, where that first virtual tape server is capable of communicating with one or more host computers via a virtual tape controller and the one or more first virtual host devices, and where a second virtual tape server includes one or more second virtual host devices comprising a second adjustable aggregate bandwidth, where that second virtual tape server is capable of communicating with the one or more host computers via the virtual tape controller and the one or more second virtual host devices, and where the first virtual tape server and the second virtual tape server exchange information via the virtual tape controller and at least two channel extenders.

Applicants' method provides a file to the virtual tape controller from the one or more host computers, writes that file to the first virtual tape server, and queues in a copy queue disposed in the virtual tape controller a copy job to copy the file to the second virtual tape server. Subsequently, the method provides the file to the second virtual tape server. The method sets a throughput threshold and an age threshold. The method determines the actual VTC throughput and the age of the queued copy job, and determines if the actual VTC throughput is greater than the throughput threshold. If the actual VTC throughput is greater than the throughput threshold, then the method determines if the age of the queued file is less than the age threshold. If the actual VTC throughput is greater than the throughput threshold and if the age of the queued file is not less than the age threshold, then the method decreases the first adjustable aggregate bandwidth and/or the second adjustable aggregate bandwidth, otherwise the method restores the adjustable bandwidth to a nominal value.

BRIEF DESCRIPTION OF THE DRAWINGS

The invention will be better understood from a reading of the following detailed description taken in conjunction with the drawings in which like reference designators are used to designate like elements, and in which:

FIG. 6 is a flow chart summarizing additional steps in Applicants' method.

DETAILED DESCRIPTION OF THE PREFERRED EMBODIMENTS

Referring to the illustrations, like numerals correspond to like parts depicted in the figures. The invention will be described as embodied in a plurality of virtual tape servers in combination with a virtual tape controller for use in a data processing environment. The following description of Applicant's apparatus and method is not meant, however, to limit Applicant's invention to either data storage and retrieval systems, or to data processing applications, as the invention herein can be applied to data storage in general.

Figure 1:
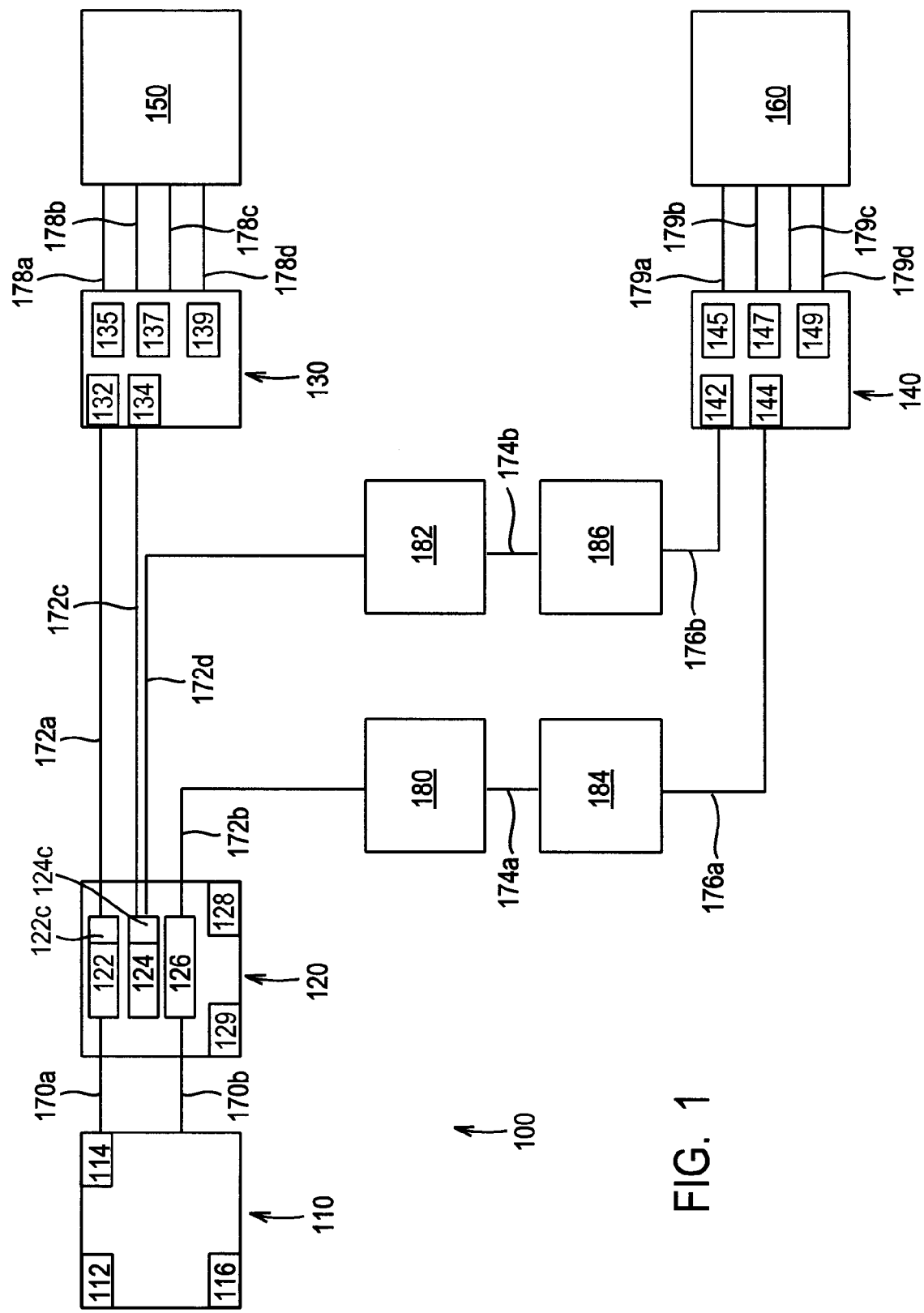
FIG. 1 is a block diagram showing Applicants' data storage and retrieval system.

Referring now to FIG. 1, Applicants' system 100 includes host computer 110, virtual tape controller 120, first virtual tape server 130, first information storage medium 150, second virtual tape server 140, second information storage medium 160, and channel extenders 180, 182, 184, and 186. In certain embodiments, channel extenders 180, 182, 184, and 186, each comprise one or more IBM 2029 optical wavelength division multiplexer using Dense Wavelength Division Multiplexing technology.

Virtual tape controller 120 comprises a plurality of individual virtual devices, such as virtual devices 122, 124, and 126. Each of these virtual devices is configured as either a virtual host device or a virtual copy device.

Host computer 110 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark of IBM Corporation, and MVS is a trademark of IBM Corporation; and UNIX is a registered trademark in the United States and other countries licensed exclusively through The Open Group.) In certain embodiments, host computer 110 includes a storage management program 114. The storage management program 114 in the host computer 110 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 114 may include known storage management program functions, such as recall and migration. The storage management program 114 may be implemented within the operating system of the host computer 112 or as a separate, installed application program. Alternatively, storage management program 114 may include device drivers, backup software, and the like.

In the illustrated embodiment of FIG. 1, host computer 110 communicates with virtual tape server 130 via communication link 170a, virtual host device 122, communication link 172a, and virtual host device 132, where virtual host device 132 has a memory and an adjustable bandwidth. In certain embodiments, communication links 170a and 172a are each selected from the group consisting of a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the illustrated embodiment of FIG. 1, host computer 110 communicates with virtual tape server 140 via communication link 170b, virtual host device 126, communication link 172b, channel extender 180, communication link 174a, channel extender 184, communication link 176a, and virtual host device 144, where virtual host device 144 has a memory and an adjustable bandwidth.

Communication links 170b, 172b, 174a, and 176a, are each selected from the group consisting of a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Virtual tape server 130 communicates with virtual tape server 140 via virtual copy device 134, communication link 172c, virtual copy device 124, communication link 172d, channel extender 182, communication link 174b, channel extender 186, communication link 176b, and virtual copy device 142, where virtual copy devices 134 and 142 each comprise a memory and an adjustable bandwidth.

In certain embodiments, communication links 172c, 172d, 174b, and 176b, are each selected from the group consisting of a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the illustrated embodiment of FIG. 1, virtual tape server 130 includes one virtual host device, namely device 132, and one virtual copy device, namely device 134. In certain embodiments, Applicants' virtual tape server 130 includes a plurality of virtual devices, where each of those virtual devices is configured as either a host device, such as virtual host device 132, or a copy device such as virtual copy device 134. In certain embodiments, virtual tape server 130 includes one or more first virtual host devices, where those one or more first virtual host devices comprises a first adjustable aggregate bandwidth.

In the illustrated embodiment of FIG. 1, virtual tape server 140 includes one virtual host device, namely device 144, and one virtual copy device, namely device 142. In certain embodiments, Applicants' virtual tape server 140 a plurality of virtual devices, where each of those virtual devices is configured as either a host device, such as virtual host device 144, or a copy device, such as virtual copy device 142. In certain embodiments, virtual tape server 140 includes one or more second virtual host devices, where those one or more second virtual host devices comprise a second adjustable aggregate bandwidth.

In the illustrated embodiment of FIG. 1, virtual tape controller 120 includes three virtual devices, i.e. devices 112, 124, and 126. In certain embodiments, Applicants' virtual tape controller 120 includes up to about 35 virtual device, where each those 35 virtual devices are configured as either a virtual host device or as a virtual copy device.

Figure 2:
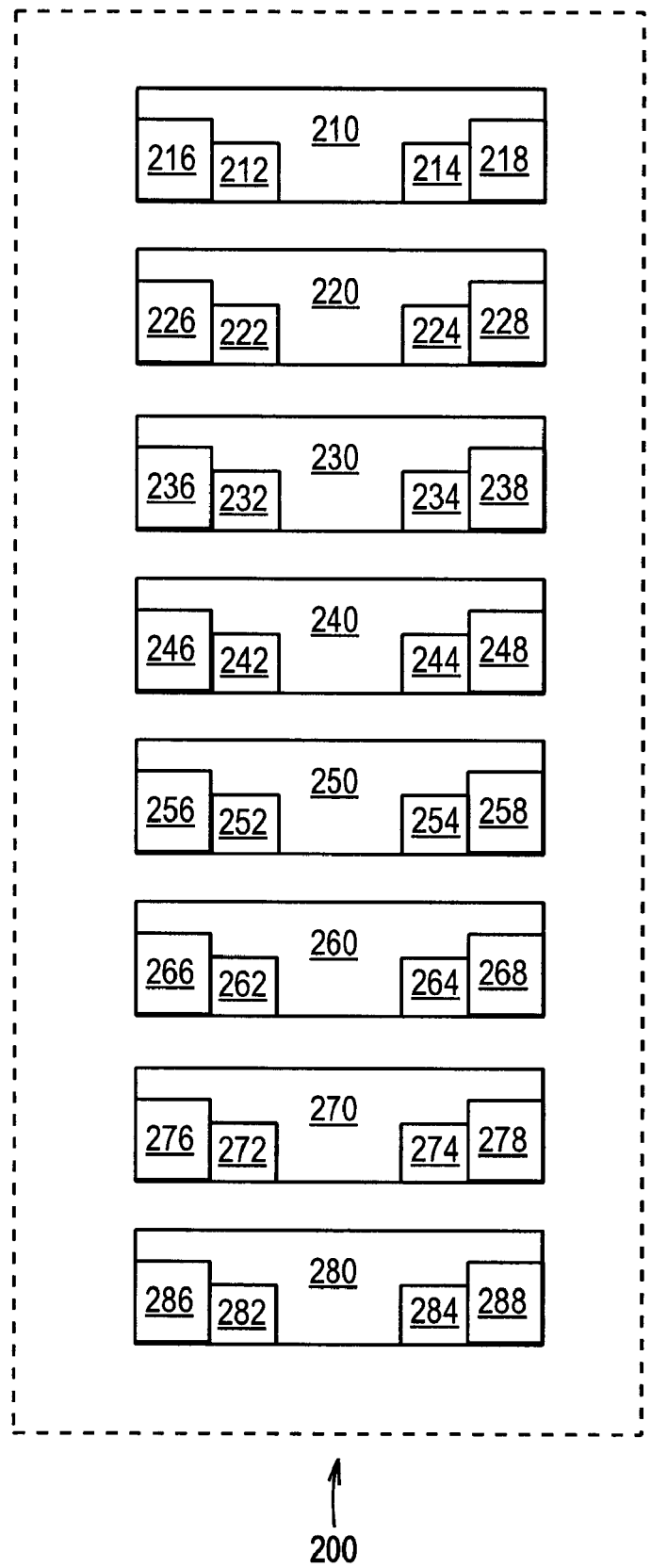
FIG. 2 is a block diagram showing the components comprising Applicants' virtual tape controller.

Referring now to FIG. 2, virtual tape controller 200 illustrates eight virtual devices, namely devices 210, 220, 230, 240, 250, 260, 270, and 280. Each virtual device includes two I/O adapters, namely I/O adapters 212, 214, 222, 224, 232, 234, 242, 244, 252, 254, 262, 264, 272, 274, 282, and 284. Each virtual device includes a processor, such as processor 216, 226, 236, 246, 256, 266, 276, and 286.

Each virtual device includes one or more memory devices, such as memory 218, 228, 238, 248, 258, 268, 278, and 288. Memory devices 218, 228, 238, 248, 258, 268, 278, and 288, are each selected from the group consisting of RAM memory, one or more DASDs, one or more hard disks, one or more electronic storage devices, and combinations thereof. By electronic storage device, Applicants mean a device such as a PROM, EPROM, EEPROM, Flash PROM, compactflash, smartmedia, and the like.

Each of the eight virtual device disposed in virtual tape controller 200 is configured as either a virtual host device, or a virtual copy device. A virtual host device, such as for example device 122 (FIG. 1), interconnects one or more host computers with a virtual tape server. A virtual copy device, such as for example device 124, interconnects two virtual tape servers.

In certain embodiments, the VTC virtual devices do not contain their own adapters, processors, and/or memory.

Instead, the VTC contains the adapters, processors and memory which are shared between the VTC virtual devices.

Figure 3:
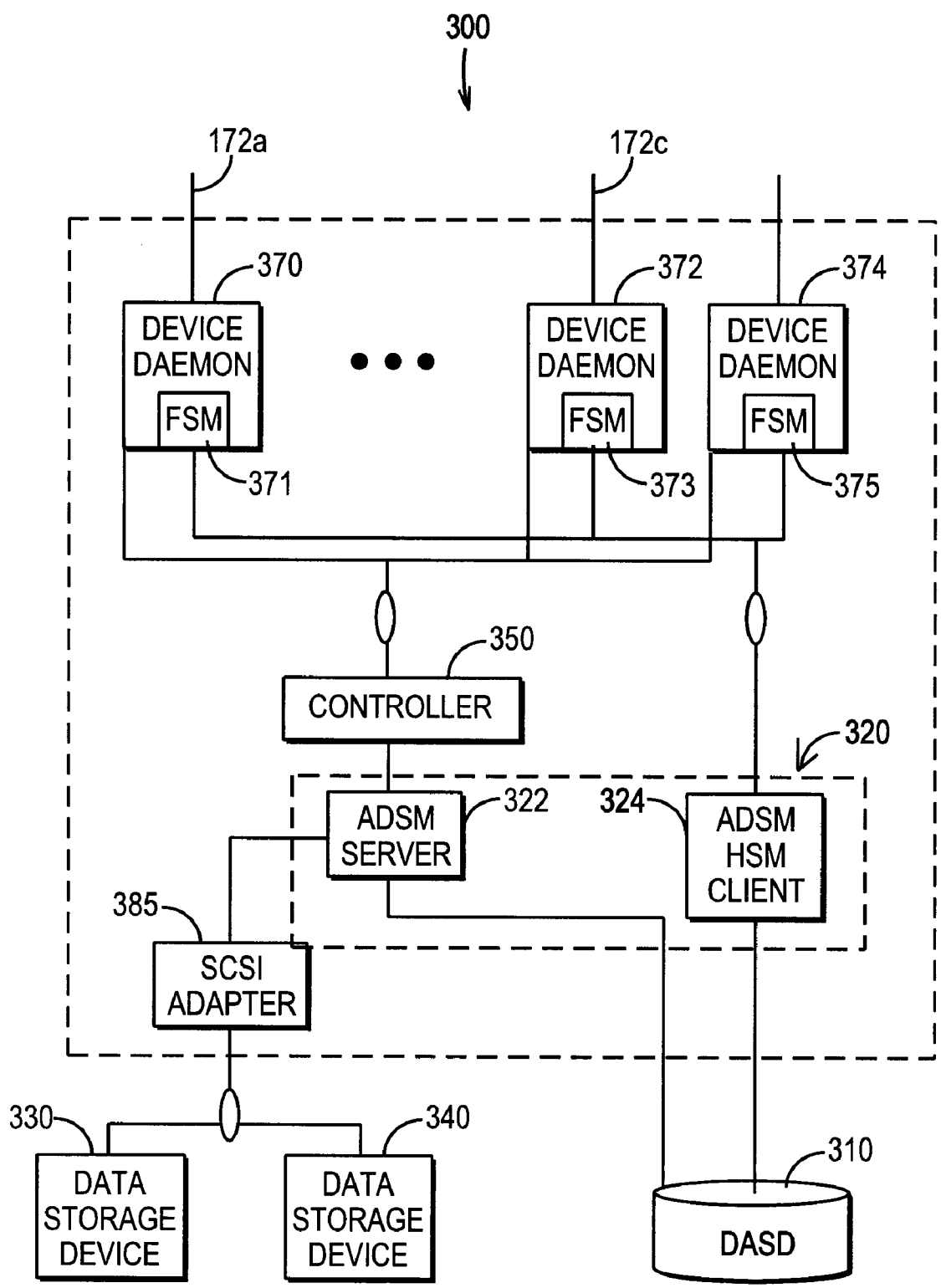
FIG. 3 is a block diagram showing the components of Applicants' virtual tape server.

Referring now to FIG. 3, virtual tape server 300 ("VTS") 300 communicates with one or more virtual tape controllers via daemons 370, 372, and 374. In the illustrated embodiment of FIG. 3, daemon 370 communicates with a virtual host device disposed in virtual tape controller controller, such device 122 (FIG. 1). In the illustrated embodiments of FIGS. 1 and 3, daemon 370 comprises a virtual host device. In the illustrated embodiment of FIG. 3, daemon 372 communicates with a virtual copy device 124 (FIG. 1) disposed in virtual tape controller 120 (FIG. 1). In this configuration, daemon 372 comprises a virtual copy device.

VTS 300 also communicates with direct access storage device (DASD) 310, a plurality of data storage devices 330 and 340. In certain embodiments, data storage devices 330 and 340 are disposed within one or more data storage and retrieval systems. In certain embodiments, DASD 310 is integral with host 110 (FIG. 1). In certain embodiments, DASD 310 is integral with VTS 300. In certain embodiments, DASD 310 is integral with a data storage and retrieval system. In certain embodiments, DASD 310 is external to host 110, VTS 300, and the one or more data storage and retrieval systems in communication with VTS 300.

VTS 300 further includes storage manager 320, such as the IBM Adstar® Distributed Storage Manager. Storage manager 320 controls the movement of data from DASD 310 to information storage media mounted in data storage devices 330 and 340. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 330 and 340 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 330 and 340.

Figure 4:
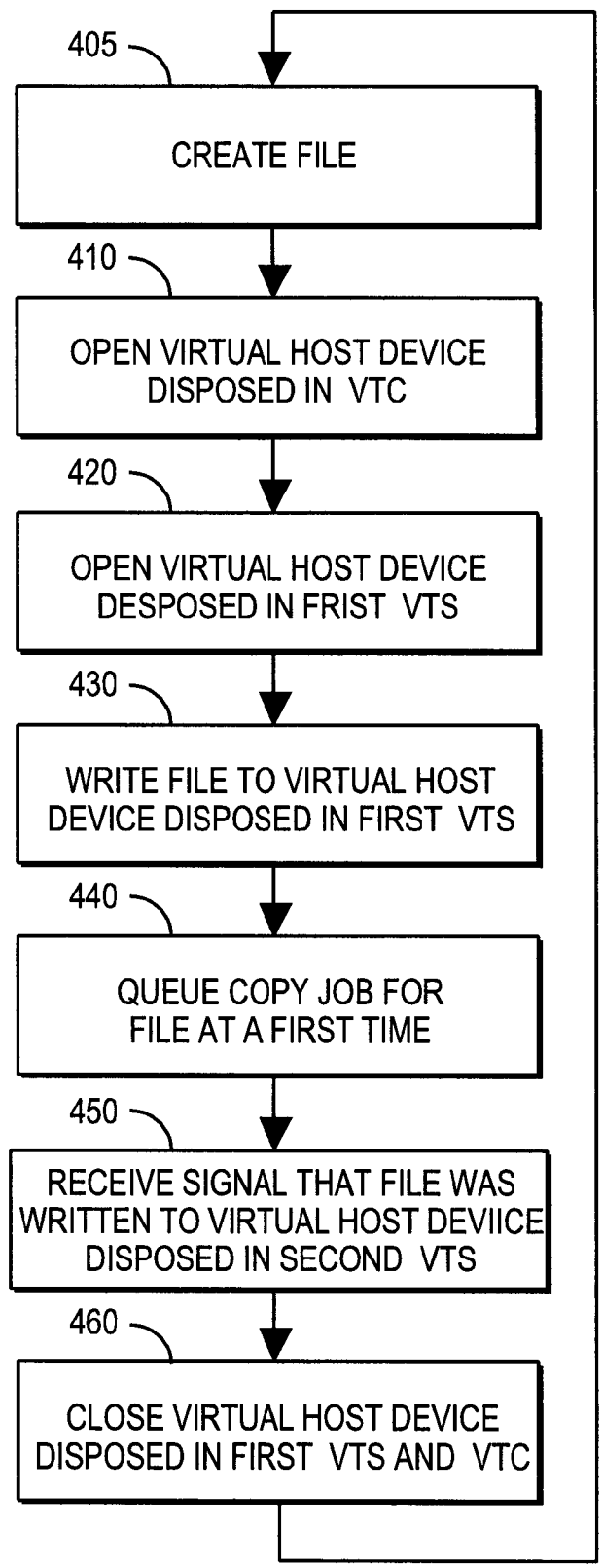
FIG. 4 is a flow chart summarizing the initial steps in Applicants' method.

Applicants' invention includes a method to write information to two geographically separated information storage media. By "geographically separated," Applicants mean two information storage media that are located more than about 50 kilometers apart. FIG. 4 summarizes the initial steps of Applicants' method.

In step 405 the method creates a file. The file of step 405 comprises information. In certain embodiments, the information of step 405 comprises one or more data packets or records. In certain embodiments, the information of step 405 comprises one or more logical volumes. In certain embodiments, the information of step 405 comprises all or portions of one or more database files. In certain embodiments, the information of step 405 comprises one or more updates for one or more database files. In certain embodiments, the information of step 405 comprises one or more log files, wherein those one or more log file comprise information relating to one or more database files. In certain embodiments, the information of step 405 comprises updates for one or more log files.

In certain embodiments, step 405 is performed by a host computer, such as host computer 110 (FIG. 1). In certain embodiments, step 405 is performed by an application running on a host computer, such as application 116 (FIG. 1).

In step 410, Applicants' method opens a virtual host device disposed in a VTC, such as virtual host device 122 (FIG. 1) disposed in VTC 120 (FIG. 1). In certain embodiments, step 410 is performed by a host computer, such as host computer 110 (FIG. 1A). In certain embodiments, step 410 is performed by an application running on a host computer, such as application 116 (FIG. 1).

In step 420, Applicants' method opens a virtual host device disposed in a first VTS, such as virtual host device 132 (FIG. 1) disposed in VTS 130 (FIG. 1). In certain embodiments, step 420 is performed by a host computer, such as host computer 110 (FIG. 1). In certain embodiments, step 420 is performed by a virtual tape controller, such as VTC 120. In certain embodiments, step 420 is performed by a virtual host device, such as virtual host device 122 (FIG. 1). In certain embodiments, step 420 is performed by a controller, such as controller 122c (FIG. 1), disposed in a virtual host device, such as virtual host device 122.

In step 430, Applicants' method writes the file of step 405 to a virtual host device, such as virtual host device 132 disposed in a first VTS, such as VTS 130. In certain embodiments, step 430 is performed by first writing the file of step 405 to a virtual host device 122 disposed in VTC 120. In certain embodiments, step 430 is performed by the virtual tape controller, such as VTC 120. In certain embodiments, step 430 is performed by a virtual host device, such as virtual host device 122. In certain embodiments, step 430 is performed by a controller, such as controller 122c, disposed in a virtual host device, such as virtual host device 122.

In step 440, Applicants' method queues in a VTC Copy Queue, such as VTC Copy Queue 129, a job to make a copy of the file of step 405 for transmission to a second VTS, such as VTS 140 (FIG. 1). In certain embodiments, step 440 is performed by the virtual tape controller, such as VTC 120. In certain embodiments, step 440 is performed by a virtual host device, such as virtual host device 122. In certain embodiments, step 440 is performed by a controller, such as controller 122c, disposed in a virtual host device, such as virtual host device 122.

In step 450, Applicants' method provides a signal that the file of step 405 has been written to the second VTS, such as VTS 140. In certain embodiments, step 450 is performed by a virtual host device, such as virtual host device 122. In certain embodiments, step 450 is performed by a virtual tape controller, such as VTC 120. In certain embodiments, step 450 is performed by a controller, such as controller 122c, disposed in a virtual host device, such as virtual host device 122. Applicants' method transitions from step 450 to step 460 wherein the method closes the virtual host devices of step 410 and 420. In certain embodiments, step 460 is performed by the virtual tape controller, such as VTC 120. In certain embodiments, step 460 is performed by a virtual host device, such as virtual host device 122. In certain embodiments, step 460 is performed by a controller, such as controller 122c, disposed in a virtual host device, such as virtual host device 122. In certain embodiments, step 460 is performed by a host computer, such as host computer 110 (FIG. 1).

Figure 5A:
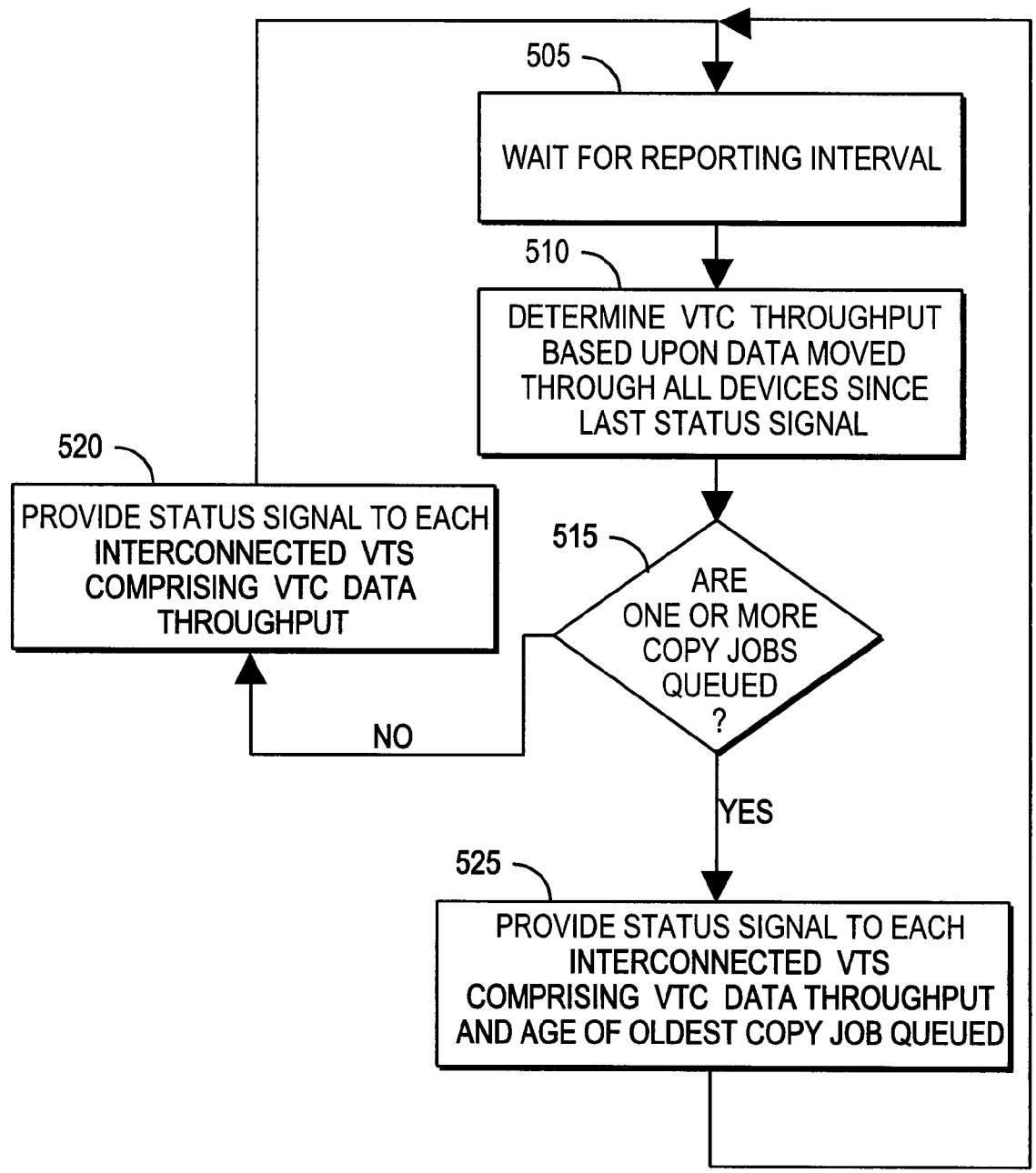
FIG. 5A is a flow chart summarizing additional steps in Applicants' method.
Figure 5B:
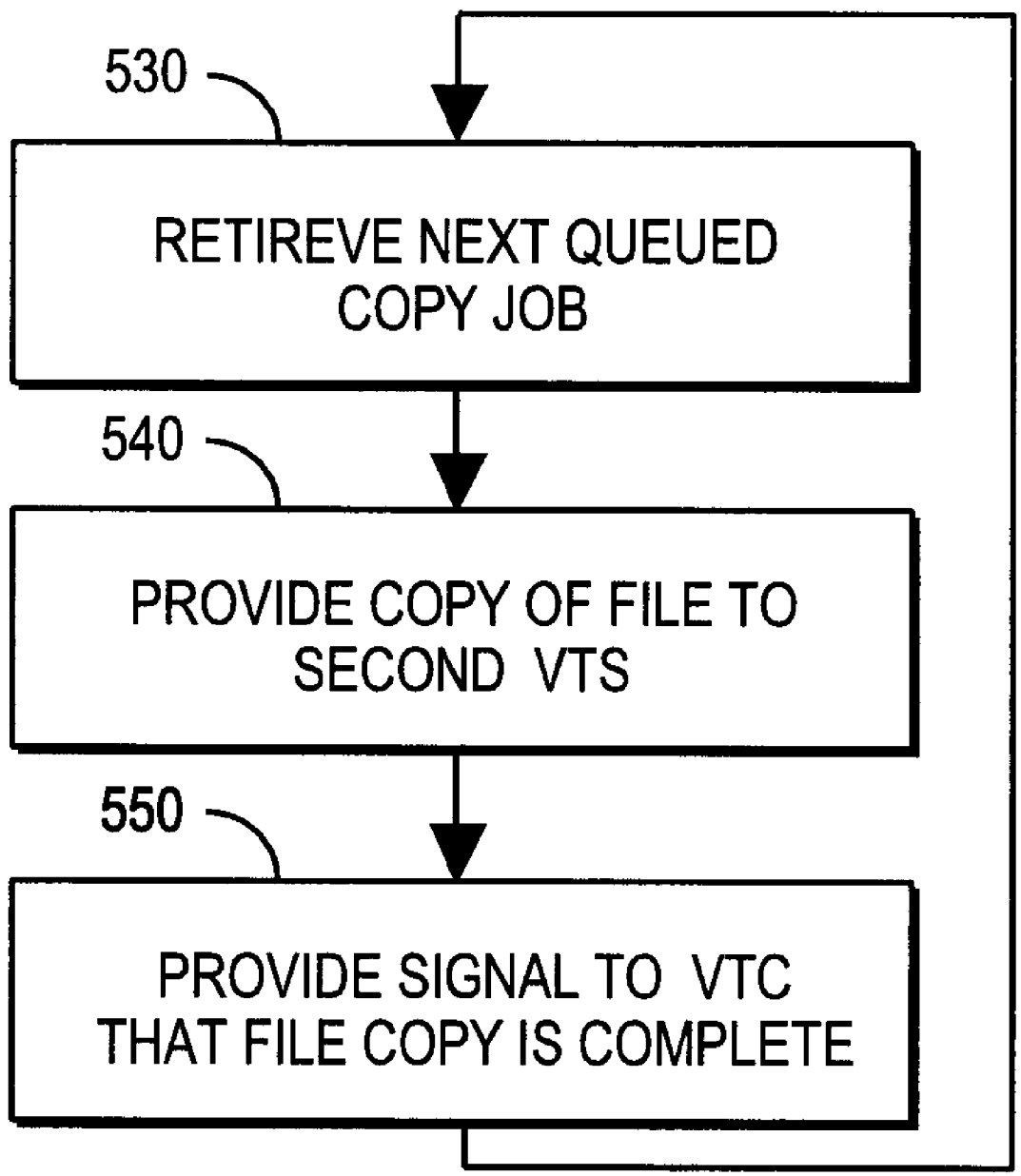
FIG. 5B is a flow chart summarizing additional steps in Applicants' method.

FIGS. 5A and 5B summarize certain steps of Applicants' method performed by a VTC, such as VTC 120 (FIG. 1). Referring now to FIG. 5A, in step 505, the VTC waits for the next status signal time interval set in step 610 (FIG. 6). At the next status signal time interval Applicants' method transitions from step 505 to 510 wherein the VTC determines an actual VTC throughput based upon the amount of data moved through all the virtual devices disposed in the VTC during the last status signal time interval. In certain embodiments, step 510 is performed by a controller, such as controller 128, disposed in the VTC, such as VTC 120.

Applicants' method transitions from step 510 to step 515 wherein the method determines if there are one or more copy jobs queued in the VTC Copy Queue, such as Copy Queue 129. In certain embodiments, step 510 is performed by a controller disposed in the VTC, such as controller 128. In certain embodiments, step 510 is performed by a virtual host device, such as virtual host device 122. In certain embodiments, step 510 is performed by a controller, such as controller 122c, disposed in a virtual host device, such as virtual host device 122.

If Applicants' method determines in step 515 that no copy jobs are queued, then Applicants' method transitions from step 515 to step 520 wherein the method provides a status signal to each interconnected VTS, where that status signal comprises a timestamp and the VTC throughput of 510. In certain embodiments, step 520 is performed by a virtual tape controller, such as VTC 120. In certain embodiments, step 520 is performed by a controller, such as controller 128, disposed in the VTC. In certain embodiments, step 520 is performed by a virtual copy device, such as virtual copy device 124. In certain embodiments, step 520 is performed by a controller, such as controller 124c, disposed in a virtual copy device, such as virtual copy device 124. Applicants' method transitions from step 520 to step 505 and continues.

If Applicants' method determines in step 515 that one or more copy jobs are queued, then the method transitions from step 515 to step 525 wherein the VTC provides a signal to each interconnected VTS, where that signal comprises a timestamp, the VTC throughput of step 510, and the age of the oldest copy job queued.

Referring now to FIG. 5B, in step 530 Applicants' method retrieves the oldest copy job queued from the VTC Copy Queue. In certain embodiments, step 530 is performed by a virtual tape controller, such as VTC 120 (FIG. 1). In certain embodiments, step 530 is performed by a controller disposed in the VTC, such as controller 128 (FIG. 1). In certain embodiments, step 530 is performed by a virtual copy device, such as virtual copy device 124. In certain embodiments, step 530 is performed by a controller, such as controller 124c, disposed in a virtual copy device, such as virtual copy device 124 (FIG. 1).

In step 540, the VTC writes the file of step 530 to a virtual copy device, such as device 142 (FIG. 1), disposed in the second VTS, such as VTS 140 (FIG. 1). In certain embodiments, step 540 is performed by a virtual tape controller, such as VTC 120. In certain embodiments, step 540 is performed by a controller disposed in the VTC, such as controller 128. In certain embodiments, step 540 is performed by a virtual copy device, such as virtual copy device 124. In certain embodiments, step 540 is performed by a controller, such as controller 124c, disposed in a virtual copy device, such as virtual copy device 124.

In step 550, the VTC receives a signal from the second VTS that the file has been written to a virtual copy device disposed in that VTS. In certain embodiments, step 550 is performed by a controller disposed in the second VTS, such as controller 145 (FIG. 1). Applicants' method transitions from step 550 to step 530 and continues.

Referring now to FIG. 6, in step 610 Applicants' method sets a status signal time interval. Each VTC periodically provides a status signal to each interconnected VTS. Those status signals are provided at the status signal time interval of step 610.

In certain embodiments, the status signal time interval of step 610 is set in firmware disposed in a memory, such as memory 218 (FIG. 2), disposed in a virtual device, such as virtual device 210 (FIG. 2). In certain embodiments, the status signal time interval is provided by a host computer, such as host computer 110 (FIG. 1). In certain embodiments, the status signal time interval of step 610 is set in firmware disposed in a controller, such as controller 135 (FIG. 1), disposed in a VTS, such as VTS 130. In certain embodiments, the status signal time interval of step 610 is set in firmware disposed in a controller, such as controller 128, disposed in a VTC, such as VTC 120.

In step 620, Applicants' method sets an age threshold. The age threshold of step 620 comprises the maximum acceptable time a copy job remains queued before completing the copy. In certain embodiments, the age threshold of step 620 is set in firmware disposed in a memory, such as memory 218, disposed in a virtual device, such as virtual device 210. In certain embodiments, the age threshold of step 620 is provided by a host computer, such as host computer 110. In certain embodiments, the age threshold of step 620 is set in firmware disposed in a controller, such as controller 135, disposed in a VTS, such as VTS 130. In certain embodiments, the age threshold of step 620 is set in firmware disposed in a controller, such as controller 128, disposed in a VTC, such as VTC 120.

In step 630, Applicants' method sets a VTC throughput threshold. The VTC throughput threshold of step 630 comprises the minimum acceptable rate of data transmission from the VTC to each attached VTS. In certain embodiments, the VTC throughput threshold of step 630 is set in firmware disposed in a memory, such as memory 218, disposed in a virtual device, such as virtual device 210. In certain embodiments, the VTC throughput threshold of step 630 is provided by a host computer, such as host computer 110. In certain embodiments, the VTC throughput threshold of step 630 is set in firmware disposed in a controller, such as controller 135, disposed in a VTS, such as VTS 130. In certain embodiments, the VTC throughput threshold of step 620 is set in firmware disposed in a controller, such as controller 128, disposed in a VTC, such as VTC 120.

In step 640, each VTS determines if it is time to check incoming signals. Each VTS checks incoming signals at a regular polling interval, such as for example every minute. In certain embodiments, the polling interval of step 640 is provided by a host computer, such as host computer 110 (FIG. 1). In certain embodiments, the polling interval of step 640 is set in firmware disposed in a controller, such as controller 135, disposed in a VTS, such as VTS 130.

In step 650, each VTS in the system determines if a VTC status signal is waiting. In certain embodiments, step 650 is performed by a controller disposed in a VTS, such as controller 135 (FIG. 1)/145 (FIG. 1). If Applicants' method determines in step 650 that a VTC message is waiting, then Applicants' method transitions from step 650 to step 660 wherein each VTS receives that VTC status signal. In certain embodiments, step 660 is performed by a controller disposed in a VTS, such as controller 135 (FIG. 1)/145 (FIG. 1). That status signal of step 660 comprises a timestamp, and the actual VTC throughput, and optionally the age of the oldest copy job queued.

Applicants' method transitions from step 660 to step 670 wherein each VTS determines if the actual VTC throughput determined by the VTC in step 510 (FIG. 5A) and received in step 660 exceeds the VTC throughput threshold of step 630. In certain embodiments, step 670 is performed by a controller disposed in a VTS, such as controller 135/145.

If Applicants' method determines in step 670 that the actual VTC throughput exceeds the VTC throughput threshold, then the method transitions from step 670 to step 680 wherein each VTS stores the oldest age value reported in the VTC message of step 660. In certain embodiments, step 680 is performed by a controller disposed in a VTS, such as controller 135/145. Applicants' method transitions from step 680 to step 650 and continues.

If Applicants' method determines in step 650 that a VTC status signal is not waiting, then the method transitions from step 650 to step 690 wherein each VTS independently determines if the age of oldest copy job queued exceeds the age threshold of step 620. In certain embodiments, step 690 is performed by a controller disposed in a VTS, such as controller 135/145.

If Applicants' method determines in step 690 that the age of the oldest copy job queued is less than the age threshold of step 620, then the method transitions from step 690 to step 685 wherein the VTS sets its aggregate adjustable bandwidth, i.e. its VTS/host bandwidth, to a pre-determined nominal value. In certain embodiments, the nominal aggregate adjustable bandwidth is provided by a host computer, such as host computer 110. In certain embodiments, the nominal aggregate adjustable bandwidth is set in firmware disposed in a controller, such as controller 135, disposed in a VTS, such as VTS 130.

If a VTS determines in step 690 that the age of a copy job queued is not less than the age threshold of step 620, then Applicants' method transitions from step 690 to step 695 wherein the VTS decreases its aggregate adjustable bandwidth, i.e. its VTS/host bandwidth.

A VTS, such as VTS 130/140, has an inherent bandwidth limited by its internal components, including for example CPU, memory, bus architecture and adapters. This bandwidth is shared by all the virtual devices on the VTS. Reducing the bandwidth allocated to one or more of virtual host devices, such as for example virtual host device 132, necessarily makes additional bandwidth available for copy device 134. Increasing the bandwidth allocated to copy device 134 increases the VTS/VTS bandwidth.

Increasing the VTS/VTS bandwidth increases VTC throughput, i.e. the rate at which files can be copied from VTS 130 to VTS 140 and vice versa.

In certain embodiments, VTS 130 (FIG. 1) receives first files from a host computer, provides those first files to virtual tape controller 120, and virtual tape controller 120 queues jobs for those files for copying to VTS 140, while simultaneously VTS 140 receives second files from a host computer, provides those second files to virtual tape controller 120, and virtual tape controller 120 queues jobs for those second files for copying to VTS 130. In these embodiments, controller 135 disposed in VTS 130 autonomically adjusts the bandwidth of the one or more virtual host devices disposed in VTS 140 while controller 145 independently autonomically adjusts the bandwidth one or more virtual host devices disposed in VTS 140. In these embodiments, Applicants' method simultaneously autonomically adjusts the host/VTS bandwidth for both the first VTS and the second VTS using the steps recited in FIGS. 4, 5, and 6. In certain embodiments, individual steps recited in FIGS. 4, 5A, 5B, and/or 6, may be implemented separately. In certain embodiments, individual steps recited in FIGS. 4, 5A, 5B, and/or 6, may be combined, eliminated, or reordered.

Applicants' invention further includes an article of manufacture comprising a computer useable medium, such as computer useable media 137 (FIG. 1) and/or 147 (FIG. 1), having computer readable program code disposed therein method to write information to two information storage media by implementing some or all of the steps recited in FIGS. 4, 5A, 5B, and/or 6.

Applicants' invention further includes a computer program product, such as for example computer program product 139 (FIG. 1) and/or 149 (FIG. 1), usable with a programmable computer processor having computer readable program code embodied therein method to write information to two information storage media by implementing some or all of the steps of FIGS. 4, 5A, 5B, and/or 6.

While the preferred embodiments of the present invention have been illustrated in detail, it should be apparent that modifications and adaptations to those embodiments may occur to one skilled in the art without departing from the scope of the present invention as set forth in the following claims.

The invention claimed is:

1. A method to write information to two geographically separated virtual tape servers, wherein a first virtual tape server comprises one or more first virtual host devices comprising a first adjustable aggregate bandwidth, wherein said first virtual tape server is capable of communicating with one or more host computers via a virtual tape controller and said one or more first virtual host devices, and wherein a second virtual tape server comprises one or more second virtual host devices comprising a second adjustable aggregate bandwidth, wherein said second virtual tape server is capable of communicating with said one or more host computers via said virtual tape controller and said one or more second virtual host devices, and wherein said first virtual tape server and said second virtual tape server exchange information via said virtual tape controller and at least two channel extenders, comprising the steps of:
   providing a file to said virtual tape controller from said one or more host computers;
   writing said file to said first virtual tape server;
   queuing a copy job in said virtual tape controller, wherein said copy job comprises copying said file to said second virtual tape server;
   setting a virtual tape controller throughput threshold;
   setting an age threshold;
   providing said file to said second virtual tape server;
   determining the age of said queued copy job;
   determining the actual virtual tape controller throughput;
   determining if said actual virtual tape controller throughput is greater than said throughput threshold;
   when said actual virtual tape controller throughput is greater than said throughput threshold, determining if the age of said queued copy job is less than said age threshold;
   when said actual virtual tape controller throughput is greater than said throughput threshold, and when the age of said queued copy job is not less than said age threshold, decreasing said first adjustable aggregate bandwidth.

2. The method of claim 1, further comprising the steps of:
   setting a nominal first adjustable aggregate bandwidth;
   when the age of said queued copy job is less than said age threshold, setting said first adjustable aggregate bandwidth to said nominal first adjustable aggregate bandwidth.

3. The method of claim 1, further comprising the step of when said actual virtual tape controller throughput is greater than said throughput threshold, and when the age of said queued copy job is not less than said age threshold, decreasing said second adjustable aggregate bandwidth.

4. The method of claim 3, further comprising the steps of:
   setting a nominal second adjustable aggregate bandwidth;
   when the age of said queued copy job is less than said age threshold, setting said second adjustable aggregate bandwidth to said nominal second adjustable aggregate bandwidth.

5. The method of claim 1, further comprising the step of providing a status signal from said virtual tape controller to each interconnected virtual tape server, wherein said status signal comprises said actual virtual tape controller throughput.

6. The method of claim 5, further comprising the steps of:
setting a status signal time interval; and
providing said status signal at each status signal time interval.

7. The method of claim 6, further comprising the step of providing a status signal comprising the age of the oldest queued copy job.

8. The method of claim 7, wherein said first virtual tape server comprises a first memory, further comprising the step of when said actual virtual tape controller throughput is greater than said throughput threshold, saving in said first memory the age of the oldest queued copy job.

9. The method of claim 8, wherein said second virtual tape server comprises a second memory, further comprising the step of when said actual virtual tape controller throughput is greater than said throughput threshold, saving in said second memory the age of the oldest queued copy job.

10. The method of claim 7, further comprising the steps of:
determining if the age of the oldest queued copy job is less than said age threshold;
when the age of the oldest file queued for copying is not less than said age threshold, and when said actual virtual tape controller throughput is greater than said throughput threshold, decreasing said first adjustable aggregate bandwidth.

11. The method of claim 10, further comprising the step of when the age of the oldest file queued for copying is not less than said age threshold, and when said actual virtual tape controller throughput is greater than said throughput threshold, decreasing said second adjustable aggregate bandwidth.

* * * * *